ABSTRACT OF THE DISCLOSURE

A railway vehicle disc brake for mounting upon a railway vehicle frame or bogie frame to co-operate with a brake rotor (such as a brake disc or discs) rotatable with a wheel of the vehicle, the brake comprising a yoke, a pair of opposed caliper levers pivotally mounted on the yoke and pivotally supporting brake shoes at their inner ends. An actuator separates the outer ends of the levers to apply the brake shoes to the brake rotor, the yoke being mounted on the said frame for angular movement about a yoke axis in the central plane of the rotor and extending generally radially of the rotor. Each shoe is supported from the frame by a suspension link which is connected by spaced, parallel pivot pins to the frame and the shoe respectively, the pivot pins being parallel with the axis of angular movement of the yoke, in such a manner that the links are effective in restraining pivotal movement of the shoes, relative to the rotor about the pivots between the shoes and the caliper levers.

---

This invention relates to improvements in railway disc brake and more specifically to the brake actuating mechanism for urging a pair of brake shoes into frictional engagement with a disc.

It is already known from British Patent 786,090 to provide a disc brake for railway vehicles in which arcuate brake shoes carrying friction pads adapted to be applied to a disc or discs rotating with a wheel or axle are mounted on opposed pivoted caliper levers of which the outer ends are separable by fluid pressure or mechanical means to apply the brake, and in which the caliper levers carrying the brake shoes are pivotally mounted on the limbs of a yoke which is mounted on the vehicle or bogie frame for angular movement about an axis lying in the central plane of the brake disc or discs and radial with respect to the axis of the disc or discs, so that the yoke and the levers can accommodate themselves to angular displacements of the disc or discs in relation to the frame or body.

Railway vehicle disc brakes of this general construction frequently exhibit an undesirable tendency to develop pronounced taper wear from one arcuate edge of the shoe to the other. This means that the friction pad material may be completely worn away at one edge although a substantial thickness of material remains at the opposite edge, and the useful life of the pad is thereby undesirably foreshortened. The present invention aims at providing a simple, but effective solution to this problem.

Accordingly, the invention provides a railway vehicle disc brake comprising a yoke, a pair of opposed caliper levers pivotally mounted on the yoke, a brake shoe having a friction pad and pivotally mounted at the inner end of each of the caliper levers, actuating means for separating the outer ends of the said levers to move the shoes towards each other, whereby in use the said friction pads can be applied to opposite sides of a brake rotor consisting of a disc or discs mounted for rotation with a wheel or axle of a brake vehicle, means for mounting the yoke on a vehicle or bogie frame for angular movement about a yoke axis lying in the central plane of the brake rotor and extending generally radially with respect to the axis of the brake rotor, whereby the yoke and levers can accommodate themselves to angular displacement of the disc or discs in relation to the frame or body, and a suspension link for each shoe, each link being pivotally connected at one end to its shoe and adapted for pivotal connection at its other end to a support structure, and wherein the axes of the pivotal connection of the links are parallel with the said yoke axis, the links serving to resist pivotal movement of the shoes, relative to the discs, about their pivotal connections with the caliper levers.

A brake of this construction is able to compensate for the major causes of misalignment encountered in practical use of railway disc brakes, namely rolling of the frame of the vehicle or bogie relative to the brake rotor, and relative lateral displacement, without unduly complicating manufacture or assembly of the brake. Indeed, as illustrated by the embodiments described below, assembly of brakes in accordance with the invention may be greatly facilitated. In these embodiments, the whole of the brake actuating structure has but three connection points to the frame on which it is mounted.

In these embodiments, the above mentioned suspension links serve, not only to restrain pivotal movement of the shoes, but also as drag links to transmit braking drag forces from the shoes directly to the frame, substantially without stressing the yoke. We are aware of the prior use of conventional drag links (per se) for this purpose, but these have not previously been constructed and arranged to restrain pivotal movement of the shoes, but have been flimsy enough to twist under the high forces to which they are subjected.

These and other features of the invention will appear from the following description of one form of disc brake in accordance therewith and a modified form of brake, taken in conjunction with the accompanying drawings, in which.

Figure 1:
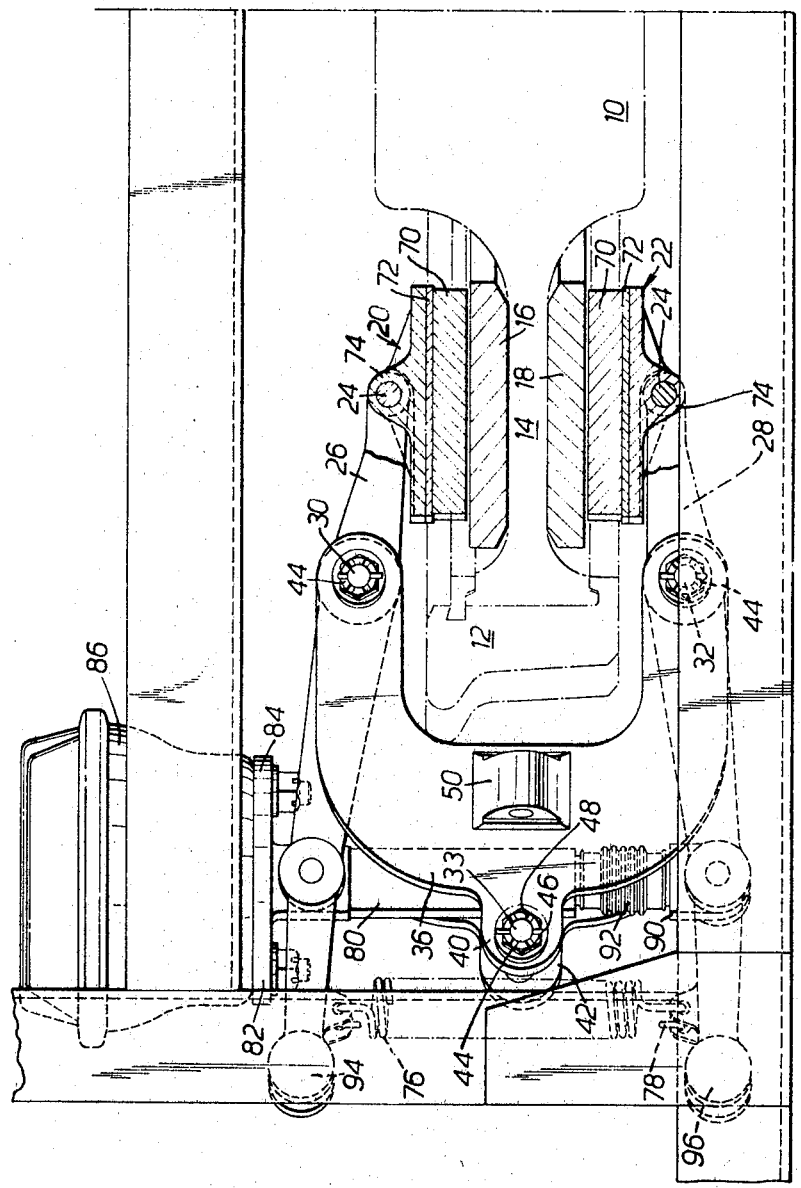
FIGURE 1 is a plan view of a bogie wheel and brake shown partially in section.
Figure 2:
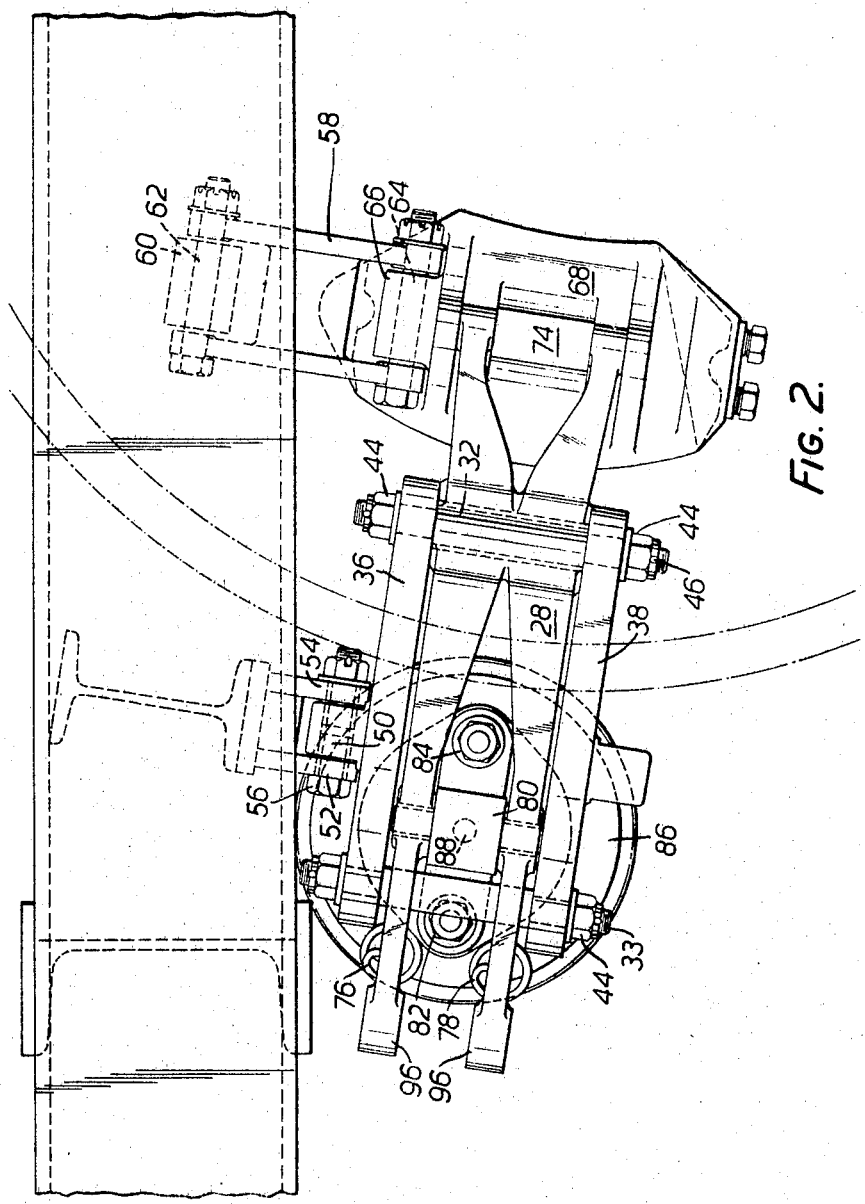
FIGURE 2 is a side elevation of the view shown in FIGURE 1.

In the disc brake shown in FIGURES 1 and 2, a wheel for a railway vehicle is mounted for rotation with a vehicle axle (not shown) and comprises a hub 10 and a tyre 12 interconnected by a web 14 located in the central plane of the wheel. A pair of annular discs 16 and 18 are secured one to each side of the web 14.

The exposed radial surfaces of the discs 16 and 18 are engageable by a pair of brake shoe assemblies 20 and 22 pivotally mounted on pins 24 located at the ends of a pair of radial, and angularly coincident caliper levers 26 and 28. The lever 26 is pivotally mounted about a pin 30 positioned within the length of the lever more closely adjacent the brake shoe end, the axis of the pin normally lying parallel to the plane of the disc 16. In like manner, lever 28 is mounted on a pin 32.

The yoke, or caliper, comprises a parallel pair of plate-like members 36 and 38 having lugs 40 and 42, respectively, which receive a third pin 33. Each of the pins 30, 32, 33 has reduced diameter threaded ends extending beyond the caliper members, which are clamped against the shoulders on the pins by nuts 44. Pegs 46 located in castelations 48 in the nuts prevent rotation of the nuts, thus producing a rigid caliper assembly.

The caliper assembly is pivotally mounted on the vehicle frame through an upstanding boss 50 on the caliper member 36 bolted between a pair of ears 52 and 54 depending from a bracket carried by the vehicle frame, and supporting a pair of bushes in which is journalled a pivot pin 56. This yoke pivot axis, which extends generally radially of the discs, is inclined by a small angle to the horizontal axis of the vehicle, and is in the central plane of the brake rotor constituted by the discs 16 and 18, to provide the first point of a three point attachment for the caliper and brake lever assembly.

As best seen in FIGURE 2, the second and third attachment points are located one at each brake shoe and individually comprise a link 58 having bifurcated ends. The upper ends receive with clearance a boss 60 extending from the vehicle frame. A bridge bolt (or pivot pin) 62 spans the upper ends of the link and passes through a bore in the boss 60 to form a pivotal connection parallel with the axis of pin 56. Similarly, a bridge bolt (or pivot pin) 64 spans the lower ends of the link and passes through a bore in a boss 66 on the brake shoe. As clearly shown by the drawing, the bifurcated ends of the links each provide two spaced bearing portions whose overall length is several times greater than the diameter of the pivot pins 62, 64, thus providing good resistance to twisting of the links. By this arrangement the brake shoes are maintained in parallel relationship with the adjacent discs, i.e. they are restrained against pivotal movement, relative to the disc, about the pivots 24.

The brake shoe assemblies are each made up of friction pad consisting of a block of friction material 70 bonded or otherwise secured to a metal backplate 72 which is preferably detachedably fixed to the shoe.

The levers 26 and 28 are bifurcated to either side of their pivotal connections and, at their ends adjacent their respective shoe assemblies the levers each straddle a boss 74 on the brake shoe which houses the pivot pin 24. A pair of tension springs 76 and 78 are arranged in parallel on the pins 30 and 32 to bias the shoe assemblies away from the disc 16 and 18.

Inwardly of the springs 76 and 78, the lever 26 pivotally supports a trunnion 80 generally of rectangular cross-section which extends towards but terminates short of the lever 28. A pneumatic motor 86 is bolted to a pair of lugs 82 and 84 on the trunnion and overhangs the lever 26, the main body of the trunnion being of a mass sufficient to counter-balance the dead weight of the motor.

The motor is of known construction having a pressure responsive diaphragm which divides the motor housing into forward and rear chambers. The rear chamber of the motor is adapted for connection with a source of pressure such as a compressed air line. The diaphragm is connected to a coaxial rod 88 which projects from the housing through a guide bore in the trunnion and has at its outer end a trunnion 90 secured between the bifurcated ends of the lever 28. A rubber boot 92 fitted between the trunnions 80 and 90 protects the rod from corrosion.

To operate the brake as a service brake, compressed air is fed to the motor chamber above the motor diaphragm, as seen in FIGURE 1, to move the rod 88 downwardly and rotate the lever 28 counter-clockwise about its pivot 32 to apply the brake shoe 22 against the disc 18 and by reaction to rotate the lever 26 clockwise about the pivot 30 to apply the brake shoe 20 against the disc 16. Upon brake release, the levers are returned to their rest position by the return springs 76 and 78.

The levers 26 and 28 have free ends 94 and 96 between which a second actuating mechanism may be inserted for the purpose of operating the brake as a parking brake, the actuator may be energized by fluid pressure or alternatively be purely mechanical.

Figure 3:
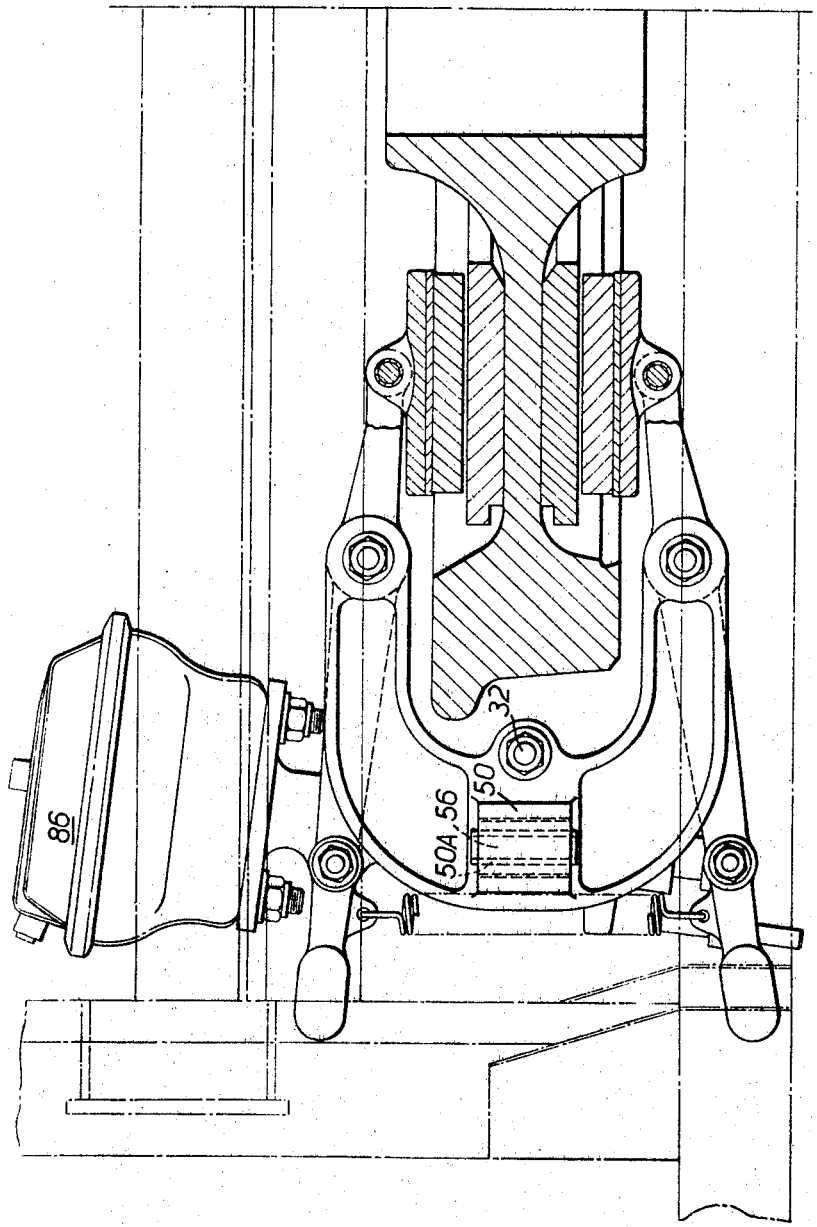
FIGURE 3 shows a modified form of the brake of FIGURES 1 and 2.

In accordance with the modifications illustrated in FIGURE 3, the caliper pivot pin 56 is disposed parallel to the axis of the wheel and brake discs, i.e. transverse to the above-mentioned yoke axis, and is located in the caliper boss 50 by means of one or more rubber bushes 50A, which constitute resilient biasing means permitting angular movement of the yoke about the yoke axis, and tending to bias it towards a central position relative to the brake rotor. The bush 50A also acts as a resilient mounting for the motor 86 to cushion inertia forces on the motor, as well as to ease alignment of the bore of boss 50 with pin 56 on initial mounting of the brake structure on a rail vehicle.

Another modification resides in positioning the caliper bolt 33 between the wheel and the pin 56, further simplifying and strengthening the yoke or caliper.

I claim:

1. A railway vehicle disc brake adapted for mounting on a frame of a rail vehicle for co-operation with a brake rotor rotatable with a wheel of said vehicle, said brake comprising: a yoke; a pair of opposed caliper levers pivotally mounted on said yoke and having inner ends disposed nearer to said brake rotor and outer ends further from said brake rotor; a pair of brake shoes carrying friction pads, said shoes being pivotally mounted at said inner ends of said respective levers; actuating means for separating said outer ends of said levers to move said shoes towards each other; mounting means for mounting said yoke on said frame for angular movement about a yoke axis in the central plane of said brake rotor and substantially radial with respect to said rotor, whereby said yoke and said levers can accommodate themselves to angular displacement of said rotor relative to said frame; two suspension links, one for each said shoe; first pivotal means pivotally connecting each of said links at one end to said respective shoe, said pivotal means having a pivotal axis parallel with said yoke axis; and second pivotal means connecting said link to sid frame and having a pivotal axis parallel with said yoke axis, said links and pivot means being adapted to resist pivotal movement of said shoes relative to said rotor about the pivotal connection between said shoes and said levers, each of said suspension links having opposed bifurcated ends each providing spaced journal portions, opposed ends of each link being adapted to receive said first and second pivotal means, respectively.

2. A brake as claimed in claim 1, wherein said mounting means and said second pivotal means constitute the sole means for mounting said brake on said vehicle.

3. A brake as claimed in claim 1, wherein said yoke comprises a pair of plate-like members and means securing said members rigidly together in spaced, parallel relationship, said levers have intermediate portions accommodated directly between said plates, and said securing means serve in providing pivotal joints between said levers and said yoke.

4. A brake as claimed in claim 1, wherein said spaced journal portions at each end of said link have an overall dimension several times greater than the diameter of the first and second pivotal means received thereby.

5. A brake as claimed in claim 1, wherein said mounting means comprises pivot pin means having a pivotal axis coincident with said yoke axis.

6. A brake in accordance with claim 1, further comprising resilient means adapted to act between said frame and said yoke to bias said yoke to a central position about said yoke axis.

7. A brake as claimed in claim 6, wherein said mounting means comprises pivot pin means having an axis transverse to said yoke axis and resilient bushing means surrounding said pivot pin means to permit said angular movement about said yoke axis and constituting said resilient means of claim 6.

References Cited

UNITED STATES PATENTS

| | | | |
|---|---|---|---|
| 343,680 | 6/1886 | Tribe. | |
| 2,377,190 | 5/1945 | Tack | 188—59 X |
| 2,873,004 | 2/1959 | Polanin | 188—59 |
| 2,890,768 | 6/1959 | Andrzejewski | 188—59 |
| 2,901,059 | 8/1959 | Stacy | 188—59 X |
| 3,092,212 | 6/1963 | Gaenssle | 188—59 |
| 3,122,218 | 2/1964 | Parton | 188—59 |

GEORGE E. A. HALVOSA, Primary Examiner